(12) United States Patent
Kallabis

(10) Patent No.: US 7,441,339 B2
(45) Date of Patent: Oct. 28, 2008

(54) MEASURING APPARATUS

(75) Inventor: Gabriel Kallabis, Spirkelbach (DE)

(73) Assignee: Stabila Messgerate Gustav Ullrich GmbH, Annweiler (DE)

( * ) Notice: Subject to any disclaimer, the term of this patent is extended or adjusted under 35 U.S.C. 154(b) by 248 days.

(21) Appl. No.: 11/527,768

(22) Filed: Sep. 27, 2006

(65) Prior Publication Data

US 2007/0068019 A1    Mar. 29, 2007

(30) Foreign Application Priority Data

Sep. 27, 2005    (DE) .................. 20 2005 015 263 U

(51) Int. Cl.
*G01C 15/00*    (2006.01)
(52) U.S. Cl. .................. 33/286; 33/296; 33/DIG. 21
(58) Field of Classification Search .................. 33/281, 33/285–286, 290–293, 296, DIG. 21
See application file for complete search history.

(56) References Cited

U.S. PATENT DOCUMENTS 3,589,757 A * 6/1971 Mooney .................. 248/188.5

| | | | |
|---|---|---|---|
| 6,256,895 B1 | 7/2001 | Akers | |
| 6,594,910 B2 * | 7/2003 | Wishart | 33/286 |
| 2002/0017028 A1 * | 2/2002 | Wishart | 33/286 |
| 2006/0086871 A1 * | 4/2006 | Joseph et al. | 248/178.1 |
| 2008/0048074 A1 * | 2/2008 | May | 248/176.1 |

FOREIGN PATENT DOCUMENTS

| DE | 19842966 | 4/2000 |
|---|---|---|
| JP | 2005049201 | 2/2005 |

* cited by examiner

*Primary Examiner*—Yaritza Guadalupe-McCall
(74) *Attorney, Agent, or Firm*—Dennison, Schultz & MacDonald

(57) ABSTRACT

A measuring apparatus including a measuring device, such as a laser measuring device with a housing, which is detachably connected to a tripod including a tripod head and emanating therefrom tripod legs which are height-adjustable and can pivot on swivel or pivot joints and which are formed of telescoping inner and outer tubes which can be fixed in a desired position in relation to one another by means of a locking element such as a union nut. At least two of the tripod legs can be put together to form a height-adjustable, clampable supporting rod extending between two boundaries spaced apart from one another.

20 Claims, 4 Drawing Sheets

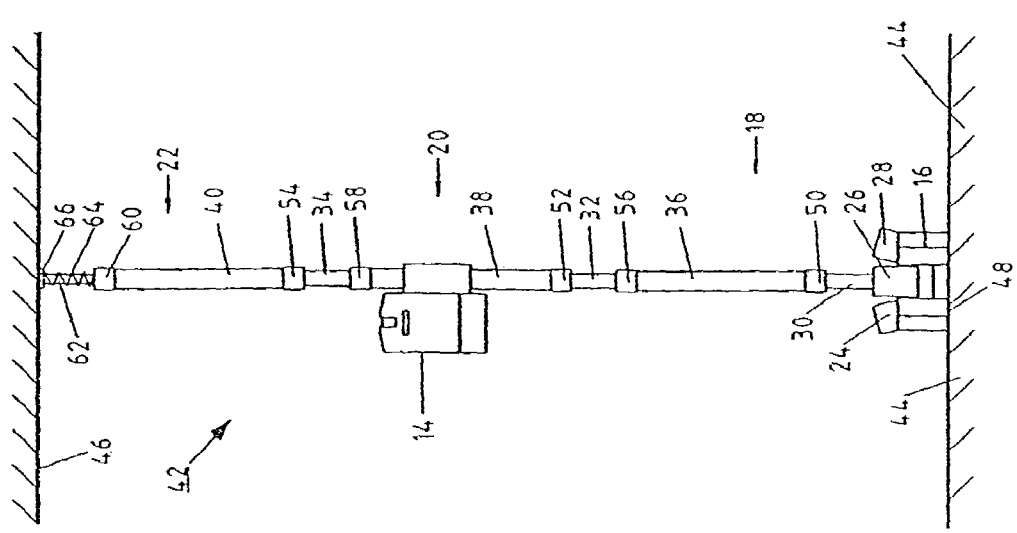
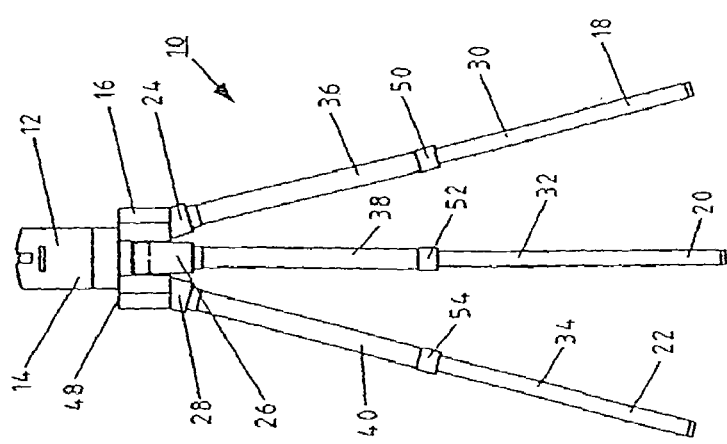

MEASURING APPARATUS

DESCRIPTION

Measuring Apparatus

The invention relates to a measuring apparatus comprising a measuring device such as a laser unit with a housing detachably connected to a tripod, which comprises a tripod head and emanating therefrom tripod legs, which are height-adjustable and can pivot on swivel or pivot joints and which consist of telescoping inner and outer tubes, which can be fixed into a desired position in relation to one another by means of a locking element such as a union nut.

Laser devices can be employed to precisely ascertain horizontal or vertical lines in structures, for example on ceilings or walls, or level surfaces in rooms. Construction lasers of this type have lasers arranged in a housing to emit light for producing lines and points. If necessary, the laser beam can be rotationally radiated by means of a prism, for example.

Measuring devices such as lasers of this type employed in construction can be secured on a tripod, namely on the tripod head thereof emanating from the tripod legs, which in principle can be pivoted in relation to the tripod head. The three tripod legs typically emanate from the tripod head to facilitate a secure set-up. Independently thereof, the height of the device can be adjusted within a certain range by adjusting the length of the tripod legs and their arrangement in relation to one another.

It is commonly known that by securing a laser on a clamping rod arranged between the floor and ceiling of a room, an optical marking can be made at nearly any height in a room.

In U.S. Pat. No. 6,804,893 a laser leveling system is proposed that comprises a height-adjustable clamping rod extending between the floor and ceiling that can be clamped into position therebetween and consists of telescoping tubes. A laser measuring device can be adjusted along the clamping rod and fixed in a desired position. Similar systems are also to be found in JP-A-2005-049201 and U.S. Pat. No. 6,256,895. The system can also be propped up in a doorframe.

DE-A-198 42 966 relates to a device for satellite-assisted measurement. In this invention, a satellite antenna is attached to an antenna mount comprising tubes that can be screwed to one anther.

The object of the present invention is to further develop a measuring apparatus of the type described at the beginning of this document to allow the measuring device to be positioned at the desired height in a room regardless of the length of each tripod leg through simple design means.

To solve the problem, the invention substantially proposes that at least two of the tripod legs can be put together to form a clampable supporting rod that can be adjusted in length between two boundaries spaced apart from one another, such as those of a room, wherein the supporting rod emanates at one end from the tripod head resting against one of the boundaries and wherein the housing of the measuring device can be adjusted along the supporting rod and fixed in a desired position thereon.

In contrast to the prior art, no separate clamping rod is used to position the measuring device in a desired position within a room. Instead, the invention proposes that the tri-pod legs themselves are assembled in such a way to allow the measuring device to be fixed in a desired position along the supporting or clamping rod formed by the tripod legs. For this purpose the measuring device housing is used, which preferably comprises an appropriate fixing element, such as a clamping element, as an integral component. Of course it is also possible to use an adapter that can be connected at one end to the measuring device and at the other end to the supporting or clamping rod. Other connecting means such as a spring bracket or a screw clamp element can also be used.

Owing to the fact that the supporting rod emanates from the tripod head resting in particular on the floor of the room, the clamping or supporting rod can be adjusted and fixed into position without any problems.

In particular, the invention provides that the tripod legs connected to the tripod head via the pivot or swivel joints for forming the supporting rod are removed from the pivot or swivel joints and that the tripod head comprises a recess, such as a centrally extending depression for the support rod tripod leg emanating from the tripod head.

Each tripod leg consists in particular of at least one inner tube and one outer tube receiving the former at least partly, wherein for the tripod legs coming together to form a supporting rod an inner tube of the first tripod leg extends at least partly within an outer tube of a second tripod leg. The inner tube of the first tripod leg can be fixed into position in the outer tube of the second tripod leg by means of a fixing element such as a clamping element or a union nut emanating from the outer tube.

To facilitate secure clamping of the supporting rod between the boundaries, which in this particular case are the floor and ceiling of a room, without requiring the total length of the interconnected tripod legs to be adjusted precisely, the invention further proposes that a spring-loaded clamping element emanates from the tripod leg facing the boundary surface and removed from the tripod head. In particular, this involves a tube extending from the far end such as a tubular or rod element emanating from and freely adjustable to the outer tube of the tripod leg extending toward the boundary, which tubular or rod element is enveloped by a spring element such as a coil spring is supported by the outer tube at one end and the tubular or rod element at the other end. As a result of this feature, the tubular or rod element can be adjusted axially, wherein the force exerted outward from the spring element acts on the tube or rod element. An appropriate clamping force can also be produced in that a spring element extends inside the tubular or rod element and is supported by the outer tube.

Alternatively, the tube or rod element can be adjustable in relation to the outer tube in the form of a spindle to allow the length to be adjusted.

Furthermore, an appropriate clamping element providing the function of a balancing element can also or alternatively emanate from the tripod leg contacting the floor.

Other designs for ensuring an adjustment of length and an appropriate fixation of the supporting rod in a simple manner are also possible.

To facilitate simple mounting of the measuring device on the supporting or clamping rod, the invention provides that the outside of the housing of the measuring device has a longitudinal groove-shaped or channel-shaped recess for the supporting rod. Here radially projecting sections spaced apart from one another and comprising parallel or substantially parallel boundary surfaces facing one another can emanate from the outside of the housing, wherein the boundary surfaces form the boundaries of the groove-shaped or channel-shaped recess. However, the sections do not necessarily have to protrude laterally above the housing.

The groove-shaped or channel-shaped recess for the supporting rod can be closed on the open side by one or two preferably spring-loaded clamping elements. The clamping element or elements emanate from the lateral sections.

According to one embodiment, a clamping element can be designed as an arched element, such as a segment from the wall of a hollow cylinder, that can be pivoted around an axis extending within the channel-like recess. To allow the clamping element to pivot and thereby expose the channel-like recess, projecting from the clamping element should be a grip that penetrates the segment of the housing containing the clamping element. The grip can extend within a window-shaped cut-out of the section.

Spring-loaded clamping elements such as jaws that can be fixed in a desired position preferably emanate from each of the housing sections bordering the groove-shaped or channel-shaped recess. For this purpose the outer surface of each jaw may comprise toothing patterns such as diagonal toothing in which the fixing element, such as a lever, engages.

Of course, it is also possible to connect the housing to the supporting or clamping rod by other means. For example, a spring bracket or a screw clamp element can be used for fixing the housing into position.

Further details, advantages and characteristics of the invention can be derived not only from the claims—taken on their own and in combination—but also from the following description of a preferred embodiment illustrated in the drawings.

BRIEF DESCRIPTION OF THE DRAWINGS

FIG. 1 a measuring device connected to a tripod,

FIG. 2 a supporting rod made from the tripod legs of the tripod illustrated in FIG. 1, which can be secured into position between the floor and ceiling of a room, FIG. 3 a perspective illustration of the housing of the measuring device illustrated in FIG. 1, FIG. 4 a tripod head, partly cut-away and FIG. 5 a bird's-eye-view of a preferred embodiment of a measuring device housing.

FIG. 1 is a general illustration of a measuring device 12, such as a laser measuring device, with a housing 14 emanating from a tripod 10. The housing 14 is detachably connected to a tripod head 16. Emanating from the tripod head 16 are tripod legs 18, 20, 22, which are detachably connected to the tripod head 16 via pivot or swivel joints 24, 26, 28. Each tripod leg 18, 20, 22 has an inner tube 30, 32, 34, which can be telescopically inserted into an outer tube 36, 38, 40 emanating from the pivot joint 24, 26, 28 to adjust the height of the tripod 10 and thereby the position of the measuring device 12. Union nuts 50, 52, 54 emanating from the outer tube 36, 38, 40 are provided for fixing the inner and outer tubes 12, 14, 16, 18, 20 into position.

The maximum height of the measuring device 12 depends on the length of the tripod legs 18, 20, 22 and their standing position. However, to allow the measuring device 12 to be arranged at a desired height in a room, the invention provides that the tripod legs 18, 20, 22 are used to form a clamping or supporting rod 42, which, for example, can be clamped into position between a floor 44 and a ceiling 46 of a room or in a doorframe. To achieve this, the tripod legs 18, 20, 22 are first removed from the pivot joints 24, 26, 28. The tripod head 16 is then positioned so that its upper surface 48 from which the housing 14 of the measuring device 12 emanates rests on the floor 44. In the middle of the tripod 16 head is a depression 25 into which one of the tripod legs 18, 20, 22 can be inserted.

Figure 3:
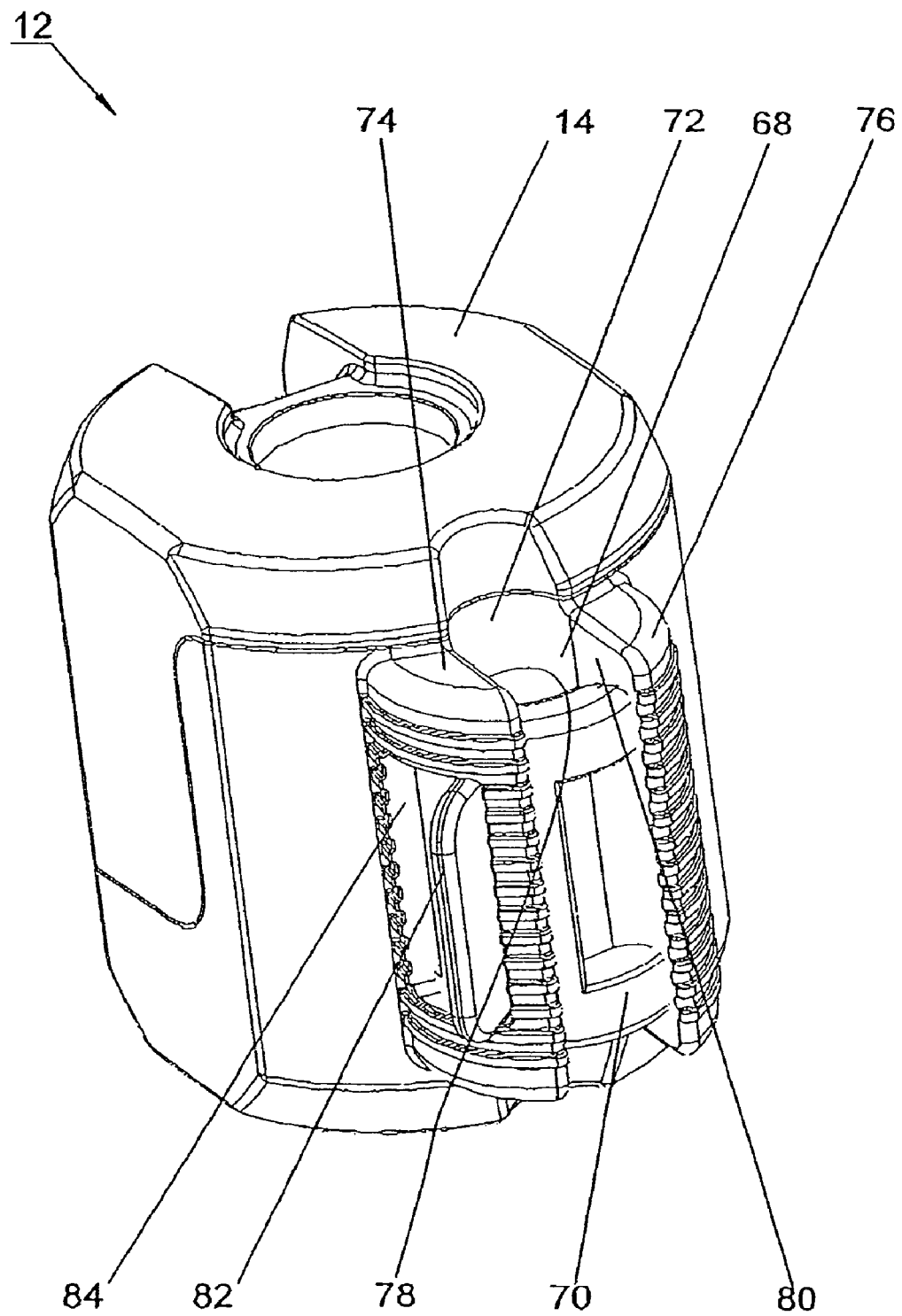
Figure 4:
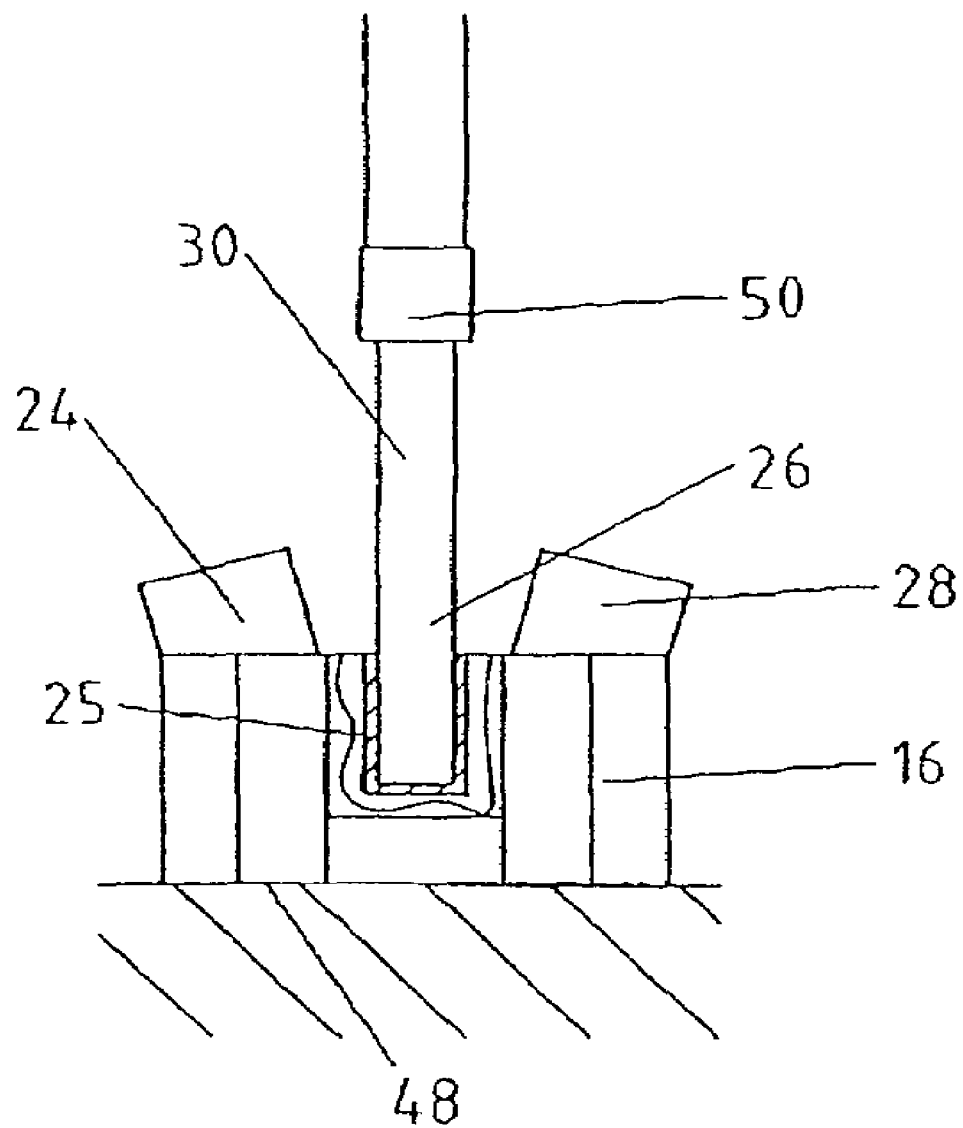
In FIG. 4 this is the tripod leg 18 with the inner tube 30.

The inner tube 32 of the tripod leg 20 is then inserted into the end of the outer tube 36, which receives the inner tube 30, at its end furthest away from the tripod head 16, wherein the inner and outer tubes can be fixed in relation to one another by means of one of the union nuts 50, 52, 54, 56, 58, 60 mentioned above or by means of additional union nuts emanating from the outer tube 36, 38, 40.

The outer tube 38 of the tripod leg 20 in turn takes up the inner tube 34 of the tripod leg 22. Inserted into the outer tube 40 of the tripod leg 22 is a spring-pretensioned tubular or rod element 62, which can be adjusted axially in relation to the outer tube 40. Here the tubular or rod element 62 is enveloped by a spring element such as a coil spring 64, which is supported by the end of the outer tube 40 or the union nut 60 at one end and a radially extending support plate or end cap 66 of the tubular or rod element 64 at the other end, wherein the latter is acted upon by an outwardly directed spring-loaded force. Through these means the supporting or clamping rod 42 can be fixed into position between two boundary surfaces such as the floor 44 and the ceiling 46 without requiring an exact adjustment of the length of the tripod legs 18, 20, 22 or their inner and outer tubes 30, 32, 34, 36, 38, 40 used to form a clamping or supporting rod 42.

Of course, the spring element 64 can also extend inside the tubular element 62 to push this component outward from the outer tube 40.

It is preferable if the clamping or supporting rod 42 is supported on the floor by the tripod head 16, yet is not a required feature. In fact the inner tube 30 can emanate directly from the floor 48.

To position the housing 14 of the measuring device 12 in a desired position along the supporting or clamping rod 42, the housing 14 as shown in the embodiment illustrated in FIG. 3 has an integrated groove-shaped or channel-shaped recess 68 for receiving the supporting or clamping rod 42 as well as a closeable clamping element 70 on the outside of this recess.

The channel-shaped recess 68 is formed by a ring-shaped depression 72 extending lengthwise down the outside of the housing 14 and by sections 74, 76 projecting radially from the housing 14, the inner surfaces 78, 80 of which extend spaced apart and parallel to one another and end flush with the ring-shaped depression 72. The inner width of the channel-shaped recess 68 is thereby designed to fit the maximum outer diameter of a segment of the tripod leg 18, 20, 22.

On the open side, the channel-shaped recess 68 can be closed by the clamping element 70, which is composed of an arc-shaped element such as a segment from the wall of a hollow cylinder and can be pivoted around an axis that extends parallel to the longitudinal axis of the housing 72 and inside the channel-shaped recess 68. The clamping element 70 is spring-loaded in such a manner that it is automatically moved into closed position. In this setting, the clamping or supporting rod 42 introduced into the recess 68 is securely clamped independently of the diameter of the segment extending through the channel-shaped recess. To allow the clamping element 70 to pivot, a plate- or bridge-shaped segment 82 serving as a handle or grip projects radially from the clamping element and, in this embodiment, penetrates the section 74 of the housing 14. For this purpose, a window-shaped cut-out 84 is provided in the section 74.

If it is preferred that a clamping element 70 constitutes an integral component of the housing 14 to fix the housing into position, then an adapter can of course also be used, via which the housing 14 can be connected to the supporting or clamping rod 42 and be fixed in a desired position.

Figure 5:
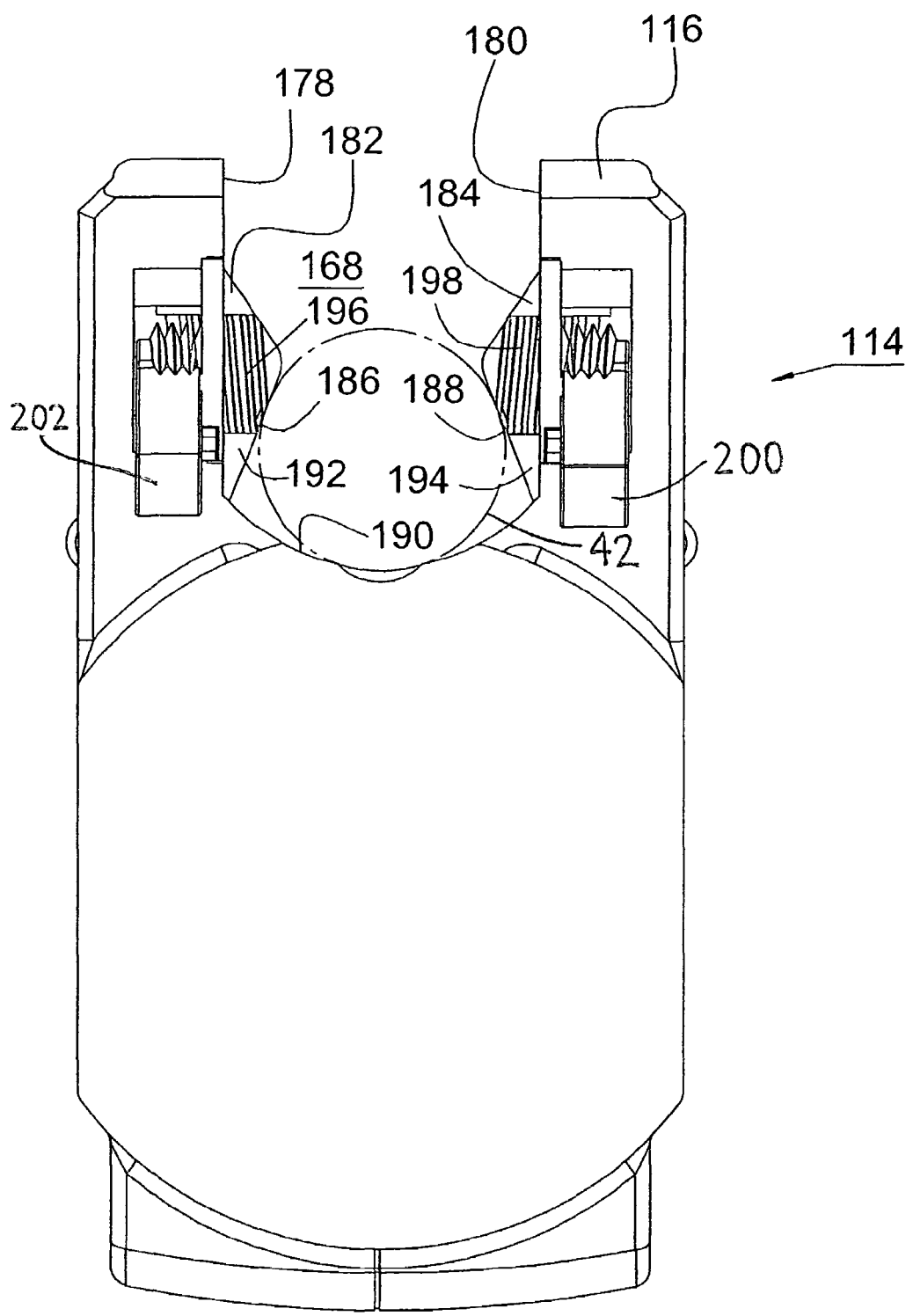

FIG. 5 illustrates a preferred embodiment for fixing the measuring device into position on the supporting rod 42. A bird's-eye-view of a measuring device housing 114 shows that it is basically rectangular in shape. Emanating from a narrow side 160 is a groove-shaped or channel-shaped recess 168, through which the supporting rod 42 penetrates to secure the measuring device. For fixing the measuring device onto the supporting rod 42, spring-loaded jaws 182, 184 emanate from the lateral boundaries 178, 180 of the recess 168, which jaws can be adjusted into the recess 168 to allow the supporting rod 42 to be securely clamped between the diagonally extending boundary surfaces 186, 188 of the jaws 182, 184 and the floor surface 190 of the recess 168.

To allow the jaws 182, 184 to be fixed into their positions for clamping the supporting rod 42, the embodiment has diagonal toothing patterns 196, 198, which project from each of the outer surfaces 192, 194 of the clamping jaws 182, 184 extending diagonally to the clamping surface 168, 188 and in which the illustrated fixing elements such as levers 200, 202 engage to prevent any displacement of the clamping jaws 182, 184.

The invention claimed is:

1. A measuring apparatus, comprising a measuring device (12), such as a laser measuring device with a housing (14), which is detachably connected to a tripod (10), comprising a tripod head (16) and emanating therefrom tripod legs (18, 20, 22) which are height-adjustable and can pivot on swivel or pivot joints (24, 26, 28) and which consist in turn of telescoping inner and outer tubes (30, 36; 32, 38; 34, 40), which can be fixed in a desired position in relation to one another by means of a locking element such as a union nut (50, 52, 54),
    characterized in that at least two of the tripod legs (18, 20, 22) can be put together to form a height-adjustable, clampable supporting rod (42) extending between two boundaries (44, 46) spaced apart from one another.

2. A measuring apparatus according to claim 1,
    characterized in that the supporting rod (42) emanates at one end from the tripod head (16) resting against one of the boundaries and that the housing (14) of the measuring devices (12) can be adjusted along the supporting rod and fixed in a desired position thereon.

3. A measuring apparatus according to claim 2,
    characterized in that a clamping element (62) emanates from the tripod leg (22) facing the boundary surface and removed from the tripod head (16).

4. A measuring apparatus according to claim 3,
    characterized in that a spring element (64) extends between the clamping element (62) and the outer tube (40), by means of which spring element the clamping element can be adjusted in relation to the outer tube.

5. A measuring apparatus according to claim 4,
    characterized in that the clamping element is a tube extending from the far end such as a tubular or rod element (22) emanating from and freely adjustable in relation to the outer tube (40) of the tripod leg (22) extending toward the boundary, that a spring element (64) such as a coil spring envelopes the tubular or rod element or is routed therein and that the spring element is supported by the tube extending from the far end at one end and the tubular or rod element or a support element (66) emanating therefrom at the other end.

6. A measuring apparatus according to claim 3,
    characterized in that the clamping element is a tubular or rod element (62), which can be rotated to be adjusted in length relative to the outer tube (40).

7. A measuring apparatus according to claim 1,
    characterized in that the tripod legs connected (18, 20, 22) to the tripod head (16) via the pivot or swivel joints (24, 26, 28) for forming the supporting rod (42) are removed from the pivot or swivel joints and that the tripod head has a recess (25) such as a centrally extending depression for the tripod leg (18) of the supporting rod (42) emanating from the tripod head.

8. A measuring apparatus according to claim 1,
    characterized in that for the tripod legs (18, 20, 22) assembled into a supporting rod (42) an inner tube (32) of the first tripod leg (20) extends at least partly within an outer tube (36) of a second tripod leg (18).

9. A measuring apparatus according to claim 8,
    characterized in that the inner tube (32) of the first tripod leg (20) can be fixed into position in the outer tube (36) of the second tripod leg (18) via a fixing element such as a clamping element or a union nut (56) emanating from the outer tube.

10. A measuring apparatus according to claim 1,
    characterized in that extending lengthwise along the outside of the housing (14) of the measuring device (12) is a groove-shaped depression (72) for receiving a segment of the supporting rod (42).

11. A measuring apparatus according to claim 10,
    characterized in that emanating from the housing (14) are two radially projecting sections (74, 76) spaced apart from one another and comprising parallel or substantially parallel boundary surfaces (78, 80), that end flush or substantially flush with the groove-shaped depression (72).

12. A measuring apparatus according to claim 11,
    characterized in that the boundary surfaces (78, 80) and the groove-shaped depression (72) form a channel-shaped recess (68) for a segment of the supporting rod (42) and that emanating from one of the radially running sections (74) is a pivotable clamping element (70), which, depending on its position, closes or exposes the open side of the channel-shaped recess.

13. A measuring apparatus according to claim 12,
    characterized in that the clamping element (70) is an arc-shaped element such as a wall segment of a hollow cylinder and can be pivoted around an axis extending parallel to the longitudinal axis of the housing (14) and in the channel-shaped recess (68).

14. A measuring apparatus according to claim 12,
    characterized in that the clamping element (70) is spring-loaded into the position closing the channel-shaped recess (68).

15. A measuring apparatus according to claim 12,
    characterized in that projecting from the clamping element (70) is a handle such as a grip (82), which outwardly penetrates the radially projecting sections (74) of the housing (14) receiving the clamping element.

16. A measuring apparatus according to claim 15,
    characterized in that the handle (82) extends within a window-like recess (82) [sic] of the section (74) and can be pivoted therein.

17. A measuring apparatus according to claim 1,
    characterized in that the housing (14) can be fixed into a desired position along the supporting rod (42) by means of a clamping element such as a spring bracket or a screw clamp element.

18. A measuring apparatus according to claim 1,
    characterized in that the housing (14) can be fixed into a desired position on the supporting rod (42) by means of a separate adapter.

19. A measuring apparatus according to claim 1,
    characterized in that the housing (114) has a channel-shaped or groove-shaped recess (168), that clamping elements (182, 184) emanating from the boundaries of the recess can be adjusted into the recess by spring-loaded force and that the supporting rod (42) can be fixed into a position between the clamping elements and the floor surface (190) of the recess (168).

20. A measuring apparatus according to claim 19,
    characterized in that the clamping element (182, 184) has on one outer surface (192, 194) a toothing pattern such as diagonal toothing (196, 198) into which a fixing element, such as lever (200, 202) emanating from the housing (114) engages to fix the clamping element into position.

\* \* \* \* \*